US011881389B2

(12) United States Patent
Yoon et al.

(10) Patent No.: US 11,881,389 B2
(45) Date of Patent: Jan. 23, 2024

(54) EXCIMER LAMP AND LIGHT IRRADIATION DEVICE HAVING THE SAME

(71) Applicant: UNILAM CO., LTD., Ulsan (KR)

(72) Inventors: Joo Young Yoon, Busan (KR); Eun Sik Kim, Busan (KR); Hong Chae Jung, Gyeongsangnam-do (KR); Se Hwi Park, Busan (KR); So Ree Kim, Ulsan (KR)

(73) Assignee: UNILAM CO., LTD., Ulsan (KR)

( * ) Notice: Subject to any disclaimer, the term of this patent is extended or adjusted under 35 U.S.C. 154(b) by 0 days.

(21) Appl. No.: 17/743,627

(22) Filed: May 13, 2022

(65) Prior Publication Data

US 2022/0367170 A1 Nov. 17, 2022

(30) Foreign Application Priority Data

May 14, 2021 (KR) ........................ 10-2021-0062877

(51) Int. Cl.
*H01J 65/00* (2006.01)
*H01J 61/06* (2006.01)
*H01J 61/54* (2006.01)

(52) U.S. Cl.
CPC ............ *H01J 61/06* (2013.01); *H01J 61/547* (2013.01); *H01J 65/00* (2013.01)

(58) Field of Classification Search
CPC ........... H01J 61/06; H01J 61/547; H01J 65/00
USPC ........................................................ 315/246
See application file for complete search history.

(56) References Cited

U.S. PATENT DOCUMENTS

| | | | | |
|---|---|---|---|---|
| 7,969,092 B1 * | 6/2011 | Wedding | H01J 11/18 | 313/582 |
| 8,035,303 B1 * | 10/2011 | Strbik, III | H01J 11/18 | 313/582 |
| 2004/0033319 A1 * | 2/2004 | Yamada | C23C 18/143 | 427/378 |
| 2013/0099679 A1 * | 4/2013 | Ikeda | H01J 61/54 | 315/183 |
| 2017/0186596 A1 | 6/2017 | Shinoda et al. | | |
| 2018/0144925 A1 * | 5/2018 | Shinoda | H01J 61/92 | |

(Continued)

FOREIGN PATENT DOCUMENTS

| | | | | |
|---|---|---|---|---|
| EP | 3 998 116 A1 | 5/2022 | | |
| KR | 2009060857 A * | 6/2009 | H01J 61/0672 | |

OTHER PUBLICATIONS

Office action dated Mar. 15, 2023 from Korean Patent Office in a counterpart Korean Patent Application No. 10-2021-0062877 (all the cited references are listed in this IDS.) (English translation is also submitted herewith.).

*Primary Examiner* — Christopher M Raabe
(74) *Attorney, Agent, or Firm* — The PL Law Group, PLLC

(57) ABSTRACT

An excimer lamp according to an embodiment of the present disclosure is capable of improving start-up characteristics and a light irradiation efficiency of a lamp and being miniaturized. The excimer lamp includes a light emitting tube emitting light, a first electrode disposed at an outer side of the light emitting tube, a second electrode disposed at an outer side of the light emitting tube in correspondence to the first electrode, and an auxiliary light emitting body disposed between the first electrode and the second electrode to emit light toward the light emitting tube when a voltage is applied to the first and second electrodes, and a light irradiation device having the same.

11 Claims, 8 Drawing Sheets

(56) References Cited

U.S. PATENT DOCUMENTS

| | | | | |
|---|---|---|---|---|
| 2020/0152442 | A1* | 5/2020 | Shinoda .................. | H01J 65/04 |
| 2022/0367171 | A1* | 11/2022 | Yoon ..................... | H01J 65/046 |

* cited by examiner

EXCIMER LAMP AND LIGHT IRRADIATION DEVICE HAVING THE SAME

CROSS-REFERENCE TO RELATED APPLICATION

This application claims the benefit under 35 USC § 119 of Korean Utility Model Application No. 10-2021-0062877, filed on May 14, 2021, in the Korean Intellectual Property Office, the entire disclosure of which is incorporated herein by reference for all purposes.

BACKGROUND

1. Field

Embodiments of the present invention relates to an excimer lamp capable of improving start-up characteristics and a light irradiation efficiency of a lamp and being miniaturized and a light irradiation device having the same.

2. Description of Related Art

In recent years, a light irradiation device using ultraviolet light is used in various fields such as industrial, environmental, medical, and sterilization fields. Among light sources used in the light irradiation device, an excimer lamp is one kind of lamp using dielectric barrier discharge. Here, the dielectric barrier discharge represents discharge generated between two electrodes separated by an insulating dielectric material, and the excimer lamp emits and irradiates light through this discharge.

Among the excimer lamps, a typical external electrode type excimer has an advantage capable of having an inexpensive manufacturing cost due to a simple configuration and a high optical efficiency by using a plurality of light emitting tubes and including a planar light source according to an arrangement method of the light emitting tubes.

FIG. 1A is a schematic plan view illustrating the typical external electrode type excimer lamp, FIG. 1B is a front cross-sectional view illustrating the excimer lamp of FIG. 1A, and FIG. 1C is a side cross-sectional view illustrating the excimer lamp of FIG. 1A. FIG. 2A is a schematic plan view illustrating a light irradiation device having the typical external electrode type excimer lamp in a state in which an auxiliary light source is disposed at a side of the excimer lamp, FIG. 2B is a plan view illustrating a state in which the auxiliary light source of FIG. 2A is disposed at a front side of the excimer lamp, FIG. 2C is a plan view illustrating a state in which the auxiliary light source of FIG. 2A is disposed at a lower side of the excimer lamp, and FIG. 2D is a side cross-sectional view illustrating the excimer lamp of FIG. 2C.

Referring to FIGS. 1A to 1C, a typical external electrode type excimer lamp 10 includes a light emitting tube 1 having an inner space S filled with a discharge gas and first and second electrodes 2 and 3 separated or electrically insulated below the light emitting tube 1 along a longitudinal direction of the light emitting tube 1.

Here, a plurality of light emitting tubes 1 may be arranged to have a planar light source structure, and a plurality of first and second electrodes 2 and 3 may be alternately arranged along the longitudinal direction of the light emitting tube 1. Here, a discharge gas for forming excimer molecules by the dielectric barrier discharge is filled in the discharge space S, excimer discharge is generated as a high frequency and high voltage power is applied to the first and second electrodes 2 and 3, and light is emitted and irradiated to the outside of the light emitting tube 1 by the excimer discharge. Here, the emitted light is used for various purposes such as light cleaning, air purification, surface modification, skin treatment, and disinfection according to a wavelength thereof.

However, since the first and second electrodes 2 and 3 of the typical external electrode type excimer lamp 10 are non-preheating type electrodes, the first and second electrodes 2 and 3 may not discharge initial electrons and inevitably use light, electrons, or radiation introduced from the outside as the initial electrons. Also, since the typical external electrode type excimer lamp is generally accommodated in the light irradiation device and shielded from the outside, start-up characteristics are poor under a low temperature environment or a dark environment. Thus, when lighting is delayed, e.g., a long time required until discharge initiation, a limitation such as lighting failure may occur.

In order to improve this limitation, an auxiliary light source such as a small-sized discharge lamp or LED may be provided at one side of the excimer lamp, and light is irradiated from the auxiliary light source to the excimer lamp. However, this case also has a limitation stated below.

Referring to FIGS. 2A and 2B, the typical external electrode type excimer lamp 10 may include an auxiliary light source 30 at a front side or a side thereof. However, when the auxiliary light source 30 is installed on the light irradiation device 20, an additional design such as an additional structure for shielding exposure of light emitted from the auxiliary light source 30 to the outside, a separate installation space for the auxiliary light source 30, and a circuit component for supplying a power to the auxiliary light source 30 is required. Accordingly, a size of the light irradiation device 20 is increased, and a manufacturing cost thereof is increased.

Also, as illustrated in FIGS. 2C and 2D, the typical external electrode type excimer lamp 10 may include the auxiliary light source 30 at a lower side thereof. However, specks may be generated in light irradiated from the excimer lamp 10 as a wavelength of light emitted from the auxiliary light source 30 is mixed and interfered by a wavelength of light emitted from the excimer lamp 10, and a total thickness of the light irradiation device 20 is increased due to the additional installation space for the auxiliary light source 30 and the additional circuit component.

SUMMARY

Embodiments of the present invention provide an excimer lamp capable of improving start-up characteristics and a light irradiation efficiency by supplying energy having the same wavelength into a light emitting tube through an auxiliary light emitting body and a light irradiation device having the same.

Embodiments of the present invention also provide an excimer lamp capable of being miniaturized and reducing a manufacturing cost because a separate space for installing an auxiliary light emitting body and a separate circuit component for power supply are not required and a light irradiation device having the same.

According to an embodiment of the present invention, an excimer lamp include: a light emitting tube configured to emit light; a first electrode disposed at an outer side of the light emitting tube; a second electrode disposed at an outer side of the light emitting FIgdisposed between the first electrode and the second electrode to emit light toward the light emitting tube when a voltage is applied to the first and second electrodes.

The light emitting tube and the auxiliary light emitting body may emit light having the same wavelength range by dielectric barrier discharge generated when the voltage is applied to the first and second electrodes.

The auxiliary light emitting body may be disposed at an outer side of the light emitting tube and disposed adjacent to facing outer surfaces of the first and second electrodes.

First and second electrode ends may respectively protrude from mutually facing outer surfaces of the first and second electrodes, and the auxiliary light emitting body may be disposed adjacent to facing outer surfaces of the first and second electrode ends.

Also, the excimer lamp may further include first and second auxiliary electrodes respectively disposed on mutually facing outer surfaces of the first and second electrodes, and the auxiliary light emitting body may be disposed adjacent to facing outer surfaces of the first and second auxiliary electrodes.

Here, the first and second auxiliary electrodes may be made of a conductive material having a foil or leaf spring structure.

Also, when at least one of the first and second electrodes is provided in plurality, the auxiliary light emitting body may be disposed in at least one of portions between the first and second electrodes.

Also, the auxiliary light emitting body may have a tube shape having an axial direction crossing that of the light emitting tube.

Here, the auxiliary light emitting body may have a cross-sectional shape of one of a circle, an ellipse, and a polygon.

Also, a maximum distance between outermost sides of a cross-section of the auxiliary light emitting body along a direction in which the first and second electrodes face each other may be less than a diameter of the light emitting tube.

According to another embodiment of the present invention, a light irradiation device includes: an excimer lamp including a light emitting tube configured to emit light, a first electrode disposed at an outer side of the light emitting tube, a second electrode disposed at an outer side of the light emitting tube in correspondence to the first electrode, and an auxiliary light emitting body disposed between the first electrode and the second electrode to emit light toward the light emitting tube when a voltage is applied to the first and second electrodes; and a case in which the excimer lamp is accommodated.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Hereinafter, preferred embodiments of the present invention will be described with reference to the accompanying drawings. Hereinafter, in the following description, specific details such as a method, a device, and/or a system are described to provide more general understandings of the present invention. However, this is merely an example, and the embodiments of the present invention are not limited thereto.

Moreover, detailed descriptions related to well-known functions or configurations will be ruled out in order not to unnecessarily obscure subject matters of the present invention. Also, terms used in this specification are terms defined in consideration of functions according to embodiments, and thus the terms may be changed according to the intension or usage of a user or operator. Therefore, the terms should be defined on the basis of the overall contents of this specification. It will be understood that although the terms are used herein to describe various embodiments of the present inventions and should the embodiments not be limited by these terms. The terms of a singular form may include plural forms unless referred to the contrary. The meaning of “include,” “comprise,” “including,” or “comprising,” specifies a property, a region, a fixed number, a step, a process, an element and/or a component but does not exclude other properties, regions, fixed numbers, steps, processes, elements and/or components.

Figure 1A:
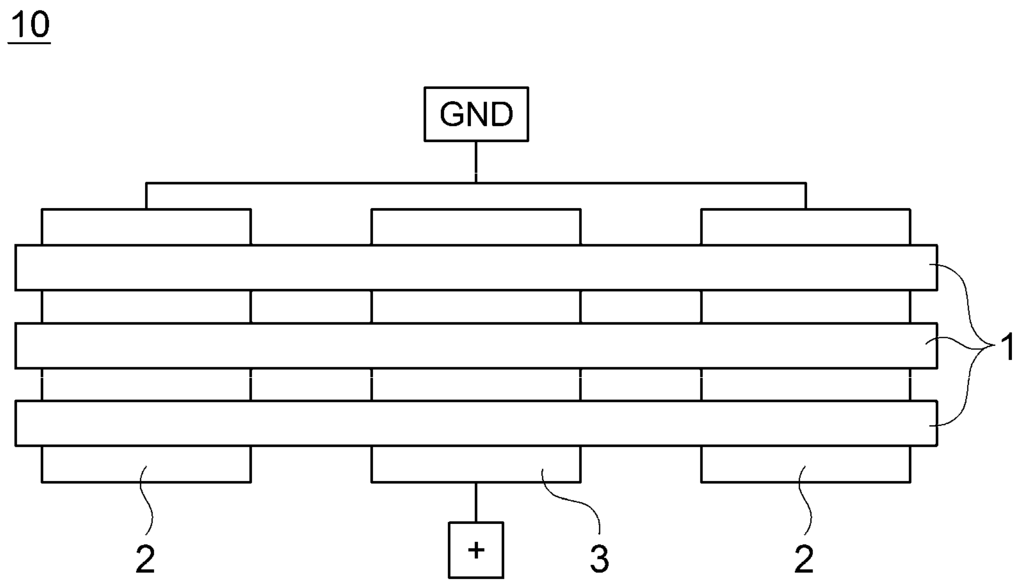
FIG. 1A is a schematic plan view illustrating a typical external electrode type excimer lamp.
Figure 1B:
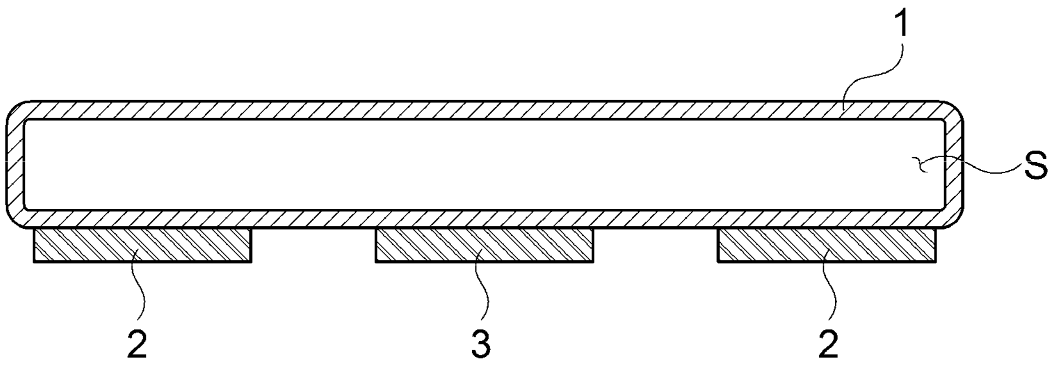
FIG. 1B is a front cross-sectional view illustrating the excimer lamp of FIG. 1A.
Figure 1C:
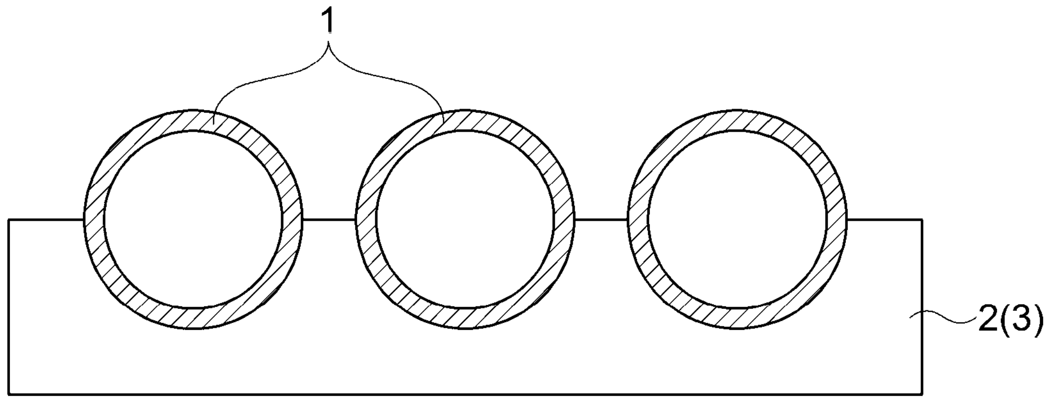
FIG. 1C is a side cross-sectional view illustrating the excimer lamp of FIG. 1A.
Figure 2A:
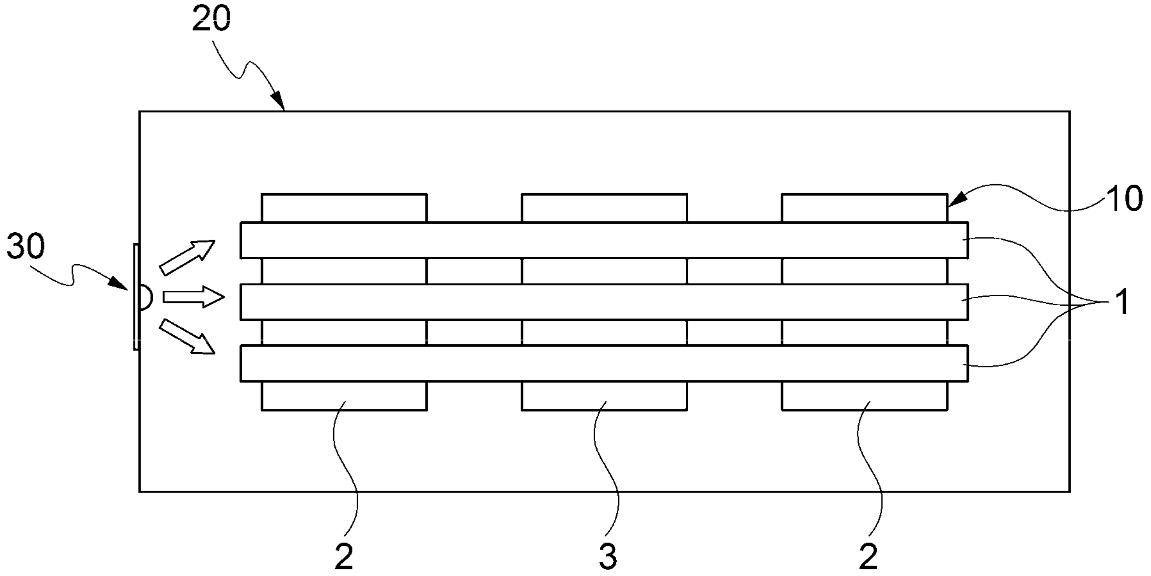
FIG. 2A is a schematic plan view illustrating a light irradiation device having the typical external electrode type excimer lamp in a state in which an auxiliary light source is disposed at a side of the excimer lamp.
Figure 2B:
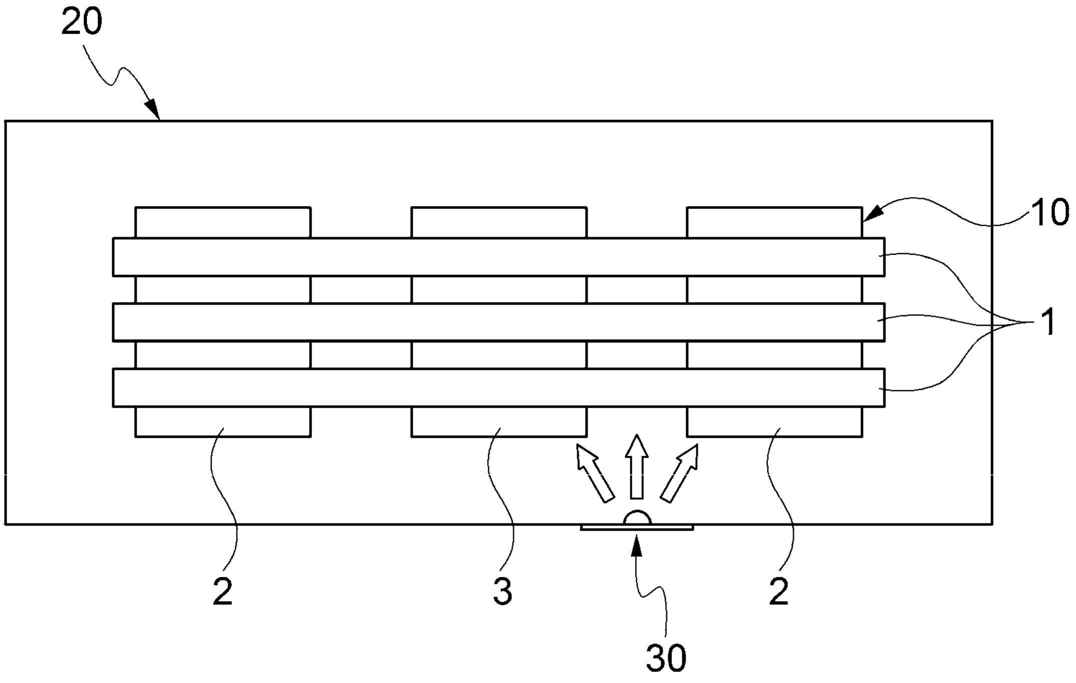
FIG. 2B is a plan view illustrating a state in which the auxiliary light source of FIG. 2A is disposed at a front side of the excimer lamp.
Figure 2C:
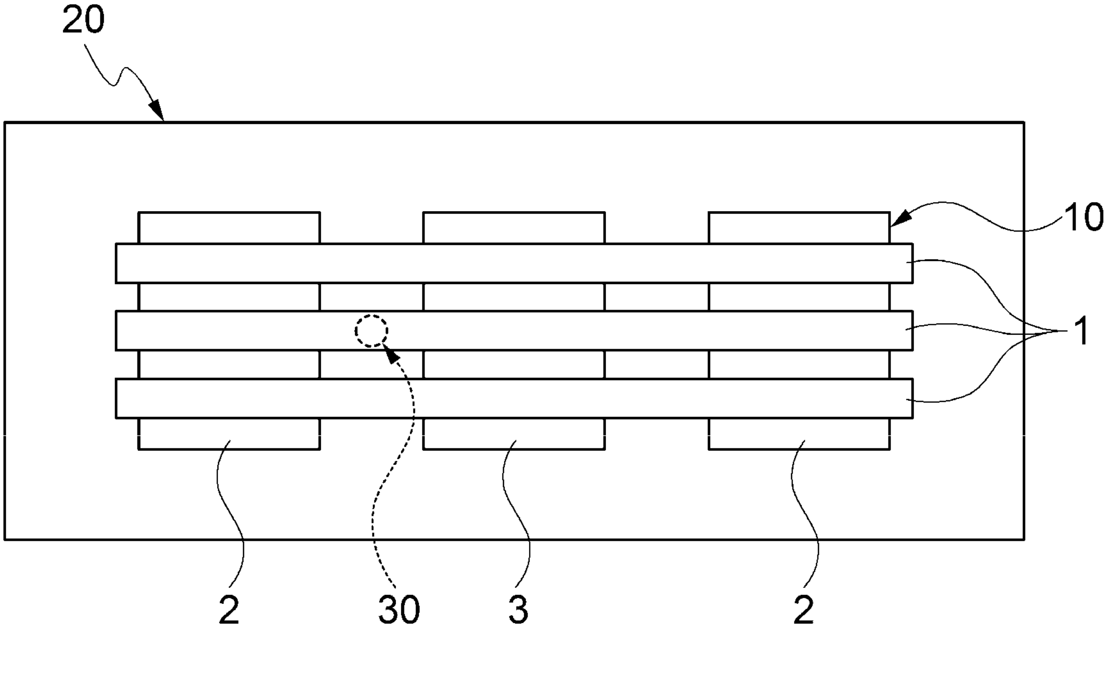
FIG. 2C is a plan view illustrating a state in which the auxiliary light source of FIG. 2A is disposed at a lower side of the excimer lamp.
Figure 2D:
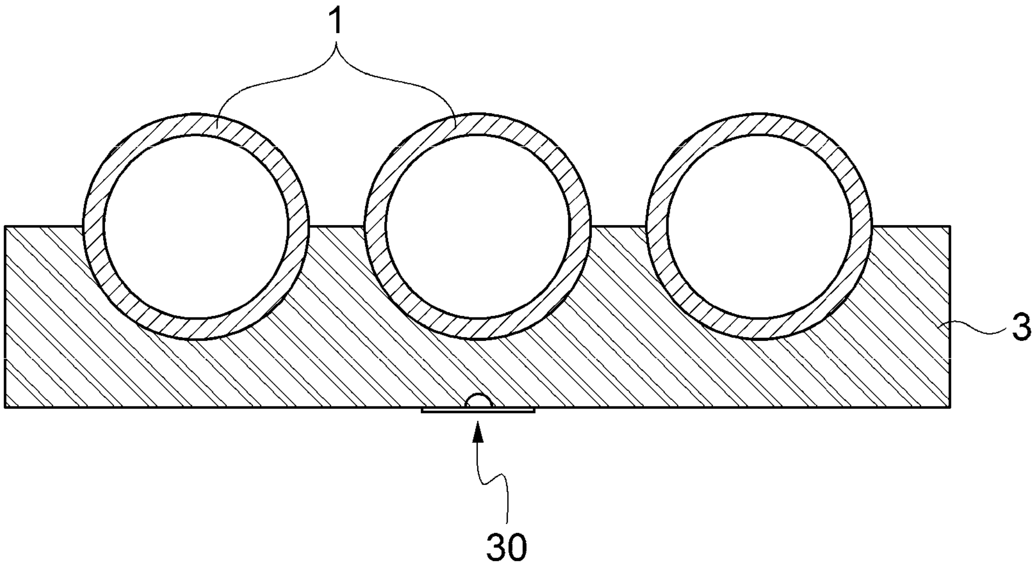
FIG. 2D is a side cross-sectional view illustrating the excimer lamp of FIG. 2C.
Figure 3:
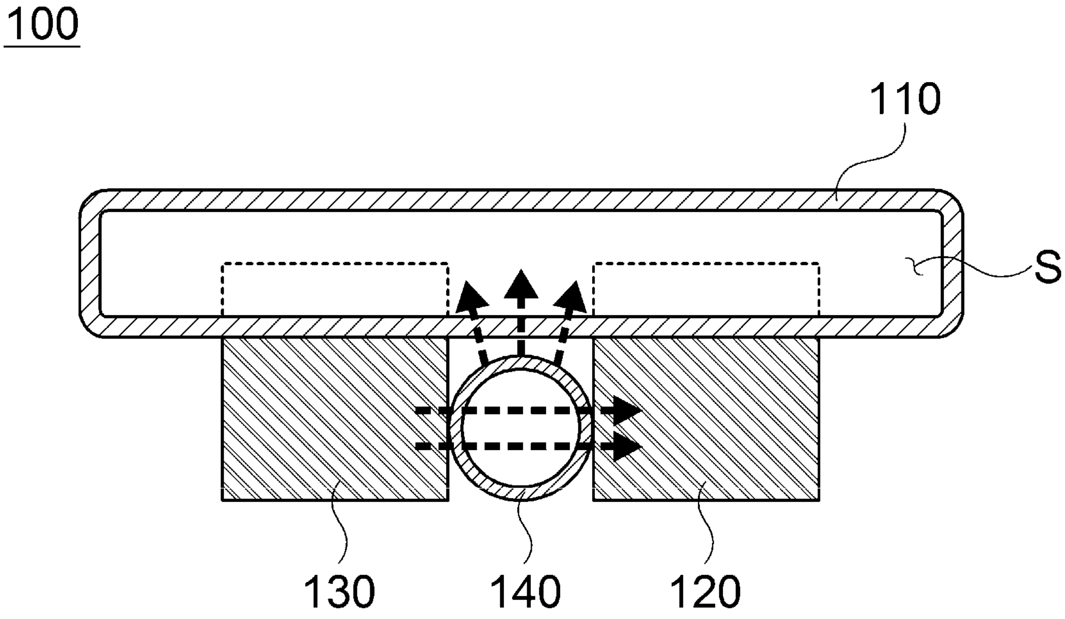
FIG. 3 is a schematic front cross-sectional view illustrating an excimer lamp according to a first embodiment of the present invention.

FIG. 3 is a schematic front cross-sectional view illustrating an excimer lamp according to a first embodiment of the present invention.

Referring to FIG. 3, an excimer lamp 100 according to the first embodiment of the present invention may include: a light emitting tube 110 having an inner space S filled with a discharge gas; a first electrode 120 disposed at a lower right side of the light emitting tube 110; a second electrode 130 disposed at a lower left side of the light emitting tube 110 in correspondence to the first electrode 120; and an auxiliary light emitting body 140 disposed between the first and second electrodes 120 and 130.

Here, the auxiliary light emitting body 140 may have a tube shape having an axial direction crossing an axial direction of the light emitting tube 110 and be disposed adjacent to mutually facing outer surfaces of the first and second electrodes 120 and 130. Here, the auxiliary light emitting body 140 may have a tube shape having a cross-sectional shape of a circle, an ellipse, and a polygon or a shape except for the circular, elliptical, or polygonal tube shape as long as the auxiliary light emitting body 140 is disposed adjacent to the mutually facing outer surfaces of the first and second electrodes 120 and 130.

Also, the same discharge gas as that filled in the inner space S of the light emitting tube 110 may be filled in the auxiliary light emitting body 140. Here, the discharge gas may be a xenon (Xe) gas that is an inert gas. However, the embodiment of the present invention is not limited thereto. For example, the discharge gas may be one of arbitrary excimers (KrCl, XeI, XeCl, Xe, etc.). Here, the auxiliary light emitting body 140 may be made of all sorts of materials through which light is transmitted by dielectric barrier discharge.

Thus, when a voltage is applied to different areas of the first and second electrodes 120 and 130, the auxiliary light emitting body 140 causes dielectric barrier discharge by an electric field generated between the first and second electrodes 120 and 130, and light emitted from the auxiliary light emitting body 140 through the dielectric barrier discharge is irradiated toward the light emitting tube 110 and supplies energy to the discharge gas existing in the inner space S of the light emitting tube 110. Accordingly, as ionization of the discharge gas is accelerated, start-up characteristics of the light emitting tube 110 and the excimer lamp 100 having the same is increased, and a lighting property thereof is improved.

Here, the light emitted from the auxiliary light emitting body 140 may have the same wavelength range as light emitted from the light emitting tube 110, and a light irradiation performance and efficiency may be improved by increasing a quantity of light irradiated to the outside through the light emitting tube 110.

Also, as the light having the same wavelength range is emitted and irradiated from the auxiliary light emitting body 140 to the light emitting tube 110, an optical defect of the light irradiated to the outside through the light emitting tube 110 such as optical specks and smears may be prevented.

Also, the auxiliary light emitting body 140 is disposed in a space between the first and second electrodes 120 and 130 and emits light through the electric field of the first and second electrodes 120 and 130. Thus, a separate space, a separate device, and a circuit component for installing the auxiliary light emitting body 140 are unnecessary. Since a size of each of the excimer lamp 100 and the light irradiation device having the same is unnecessary to be increased for improving the start-up characteristics, the excimer lamp 100 and the light irradiation device having the same may be miniaturized, and manufacturing costs may be saved.

Figure 4:
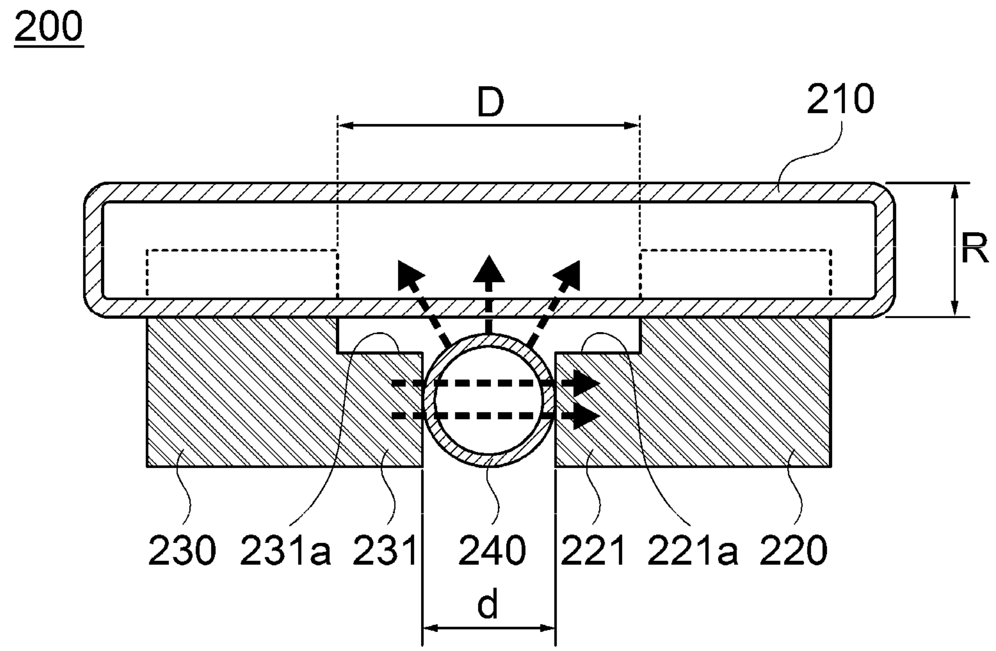
FIG. 4 is a schematic front cross-sectional view illustrating an excimer lamp according to a second embodiment of the present invention.
Figure 5A:
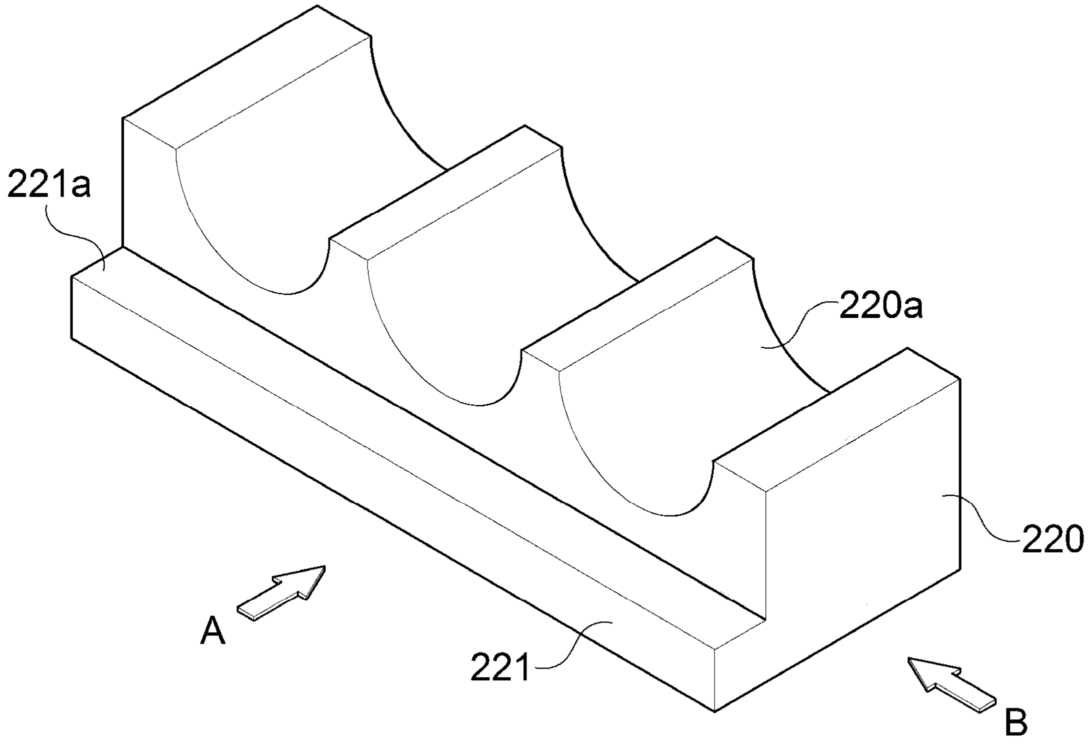
FIG. 5A is a perspective view illustrating a first electrode of FIG. 4.
Figure 5B:
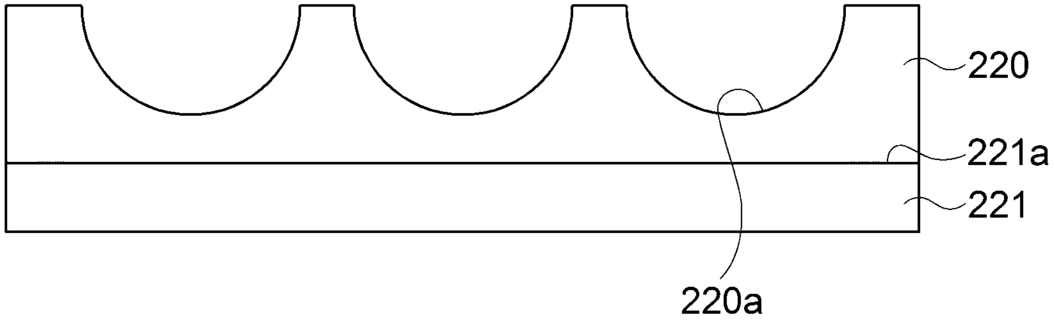
FIG. 5B is a view illustrating the first electrode of FIG. 5A in A direction.
Figure 5C:
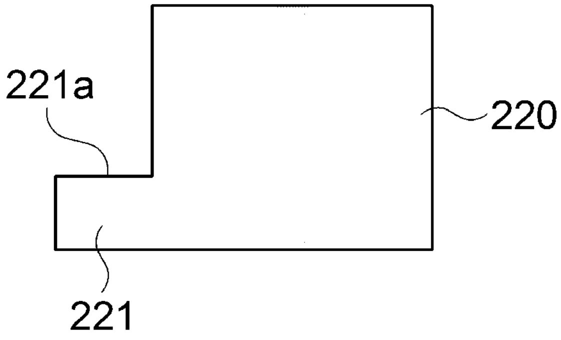
FIG. 5C is a view illustrating the first electrode of FIG. 5A in B direction.

FIG. 4 is a schematic front cross-sectional view illustrating an excimer lamp according to a second embodiment of the present invention, FIG. 5A is a perspective view illustrating a first electrode of FIG. 4, FIG. 5B is a view illustrating the first electrode of FIG. 5A in A direction, and FIG. 5C is a view illustrating the first electrode of FIG. 5A in B direction.

Referring to FIGS. 4 to 5C, an excimer lamp 200 according to the second embodiment of the present invention may include: a light emitting tube 210 having an inner space filled with a discharge gas; a first electrode 220 disposed at a lower right side of the light emitting tube 210; a second electrode 230 disposed at a lower left side of the light emitting tube 110 in correspondence to the first electrode 220; and an auxiliary light emitting body 240 disposed between the first and second electrodes 220 and 230, which is similar to the above-described first embodiment.

Here, the excimer lamp 200 according to the second embodiment of the present invention includes protruding first and second electrode ends 221 and 231 respectively disposed at lower portions of the first and second electrodes 220 and 230, which is unlike to the above-described first embodiment.

More specifically, in the first and second electrodes 220 and 230 according to this embodiment, the first and second electrode ends 221 and 231 respectively protrude from mutually facing outer surfaces disposed below the light emitting tube 210, and the auxiliary light emitting body 240 is disposed adjacent to mutually facing outer surfaces of the first and second electrode ends 221 and 231.

Here, the excimer lamp 200 according to this embodiment may include the auxiliary light emitting body 240 between the first and second electrode ends 221 and 231 protruding from the first and second electrodes 220 and 230 in a state in which a distance D between the first and second electrodes 220 and 230 is maintained to optimize a optical characteristic caused by discharge of the light emitting tube 210. Thus, the excimer lamp 200 according to this embodiment and the light irradiation device having the same may improve a light irradiation efficiency and start-up characteristics caused by the auxiliary light emitting body 240 while maintaining an optimized optical characteristic.

Also, a maximum distance d between outermost sides of a cross-section of the auxiliary light emitting body 240 in a direction in which the first and second electrodes 220 and 230 face each other may be less than a diameter R of the light emitting tube 210. For example, when the auxiliary light emitting body 240 has a tube shape, the auxiliary light emitting body 240 may have a diameter less than the diameter R of the light emitting tube 210. Thus, the excimer lamp 200 according to this embodiment and the light irradiation device having the same may improve a light irradiation efficiency and start-up characteristics caused by the auxiliary light emitting body 240 without changing a size of each of the existing excimer lamp and the light irradiation device having the same.

Also, as the first and second electrode ends 221 and 231 protrude from the first and second electrodes 220 and 230, top surfaces 221*a* and 231*a* thereof may be formed as light reflection surfaces, and thus the start-up characteristics and the light irradiation efficiency may be further improved.

The above-described structure of the first embodiment may be applied similarly to the excimer lamp 200 according to this embodiment and the light irradiation device having the same except for the structure related to the first and second electrode ends 221 and 231.

Figure 6:
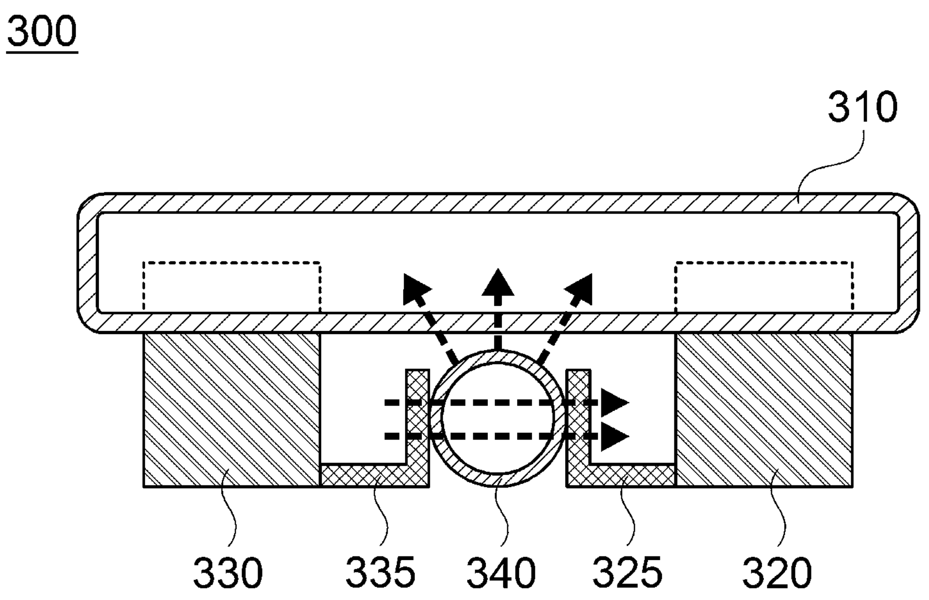
FIG. 6 is a schematic front cross-sectional view illustrating an excimer lamp according to a third embodiment of the present invention.

FIG. 6 is a schematic front cross-sectional view illustrating an excimer lamp according to a third embodiment of the present invention.

Referring to FIG. 6, an excimer lamp 300 according to the third embodiment of the present invention may include: a light emitting tube 310 having an inner space filled with a discharge gas; a first electrode 320 disposed at a lower right side of the light emitting tube 310; a second electrode 330 disposed at a lower left side of the light emitting tube 110 in correspondence to the first electrode 320; and an auxiliary light emitting body 340 disposed between the first and second electrodes 320 and 330, which is similar to the above-described second embodiment.

Here, the excimer lamp 300 according to the third embodiment of the present invention includes first and second auxiliary electrodes 325 and 335 respectively disposed at lower portions of the first and second electrodes 325 and 335, which is unlike to the above-described second embodiment.

More specifically, the first and second auxiliary electrodes 325 and 335 are respectively disposed on mutually facing outer surfaces of the first and second electrodes 320 and 330 according to this embodiment, and the auxiliary light emitting body 340 is disposed adjacent to facing outer surfaces of the first and second auxiliary electrodes 325 and 335.

Here, each of the first and second auxiliary electrodes 325 and 335 may be made of a conductive material having a foil or leaf spring structure. Thus, this embodiment also may improve start-up characteristics and a light irradiation efficiency of the excimer lamp 300 and the light irradiation device having the same and save miniaturization and manufacturing costs thereof by inducing light emission caused by discharge of the auxiliary light emitting body 340 through an electric field of the first and second auxiliary electrodes 325 and 335 electrically connected to the first and second electrodes 320 and 330.

The above-described structure of the second embodiment may be applied similarly to the excimer lamp 300 according to this embodiment and the light irradiation device having the same except for the structure related to the first and second auxiliary electrodes 325 and 335.

Figure 7A:
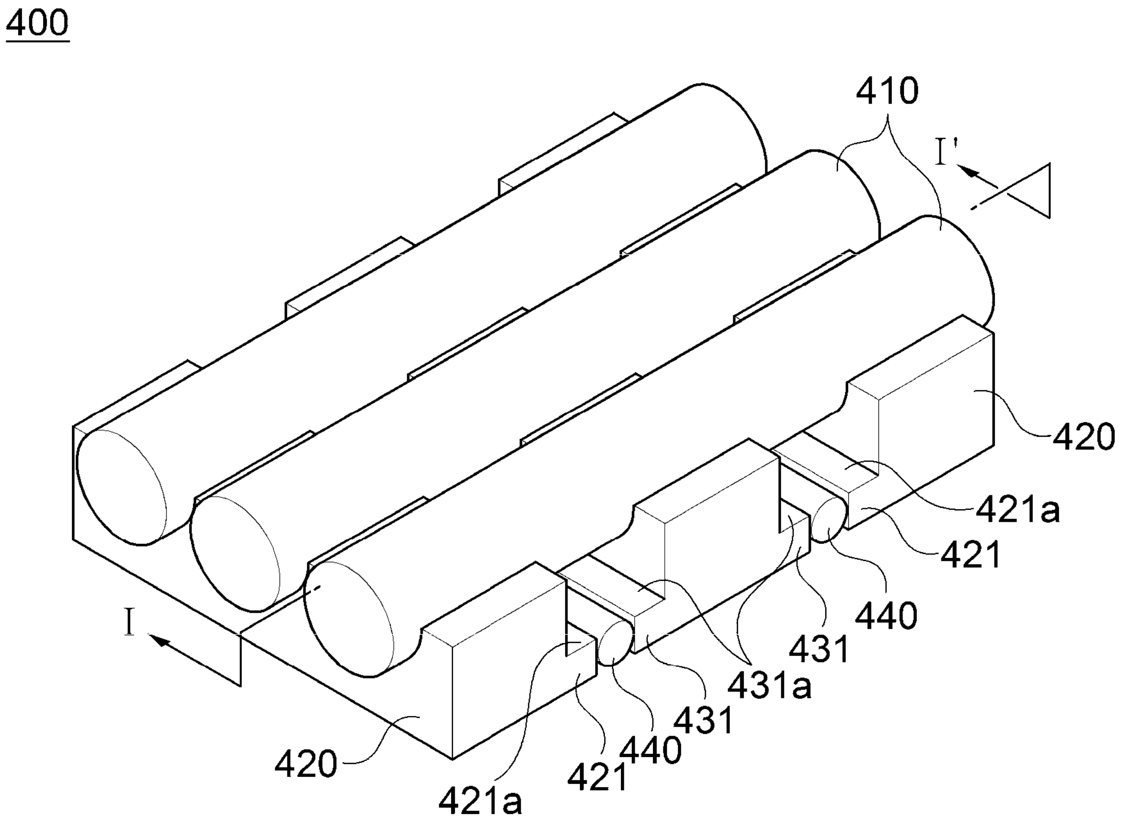
FIG. 7A is a schematic perspective view illustrating an excimer lamp according to a fourth embodiment of the present invention.
Figure 7B:
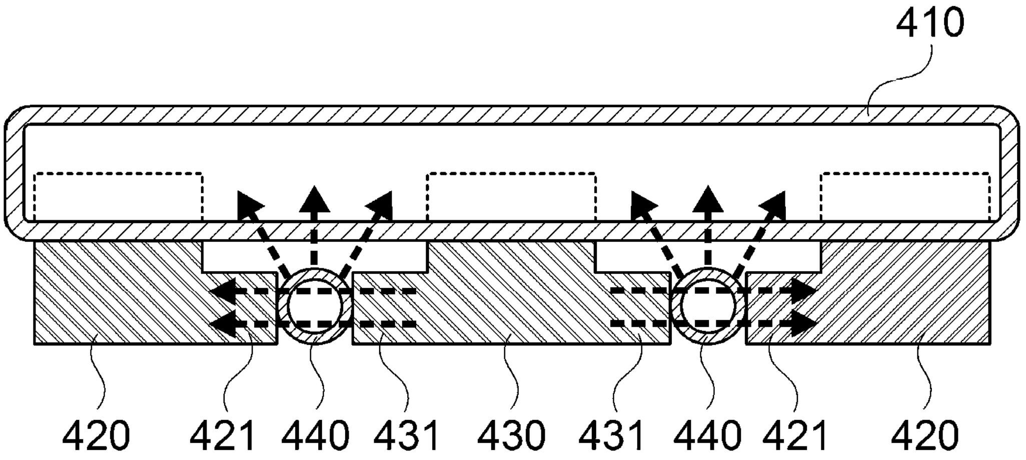
FIG. 7B is a cross-sectional view taken along line I-I' of FIG. 7A.
Figure 7C:
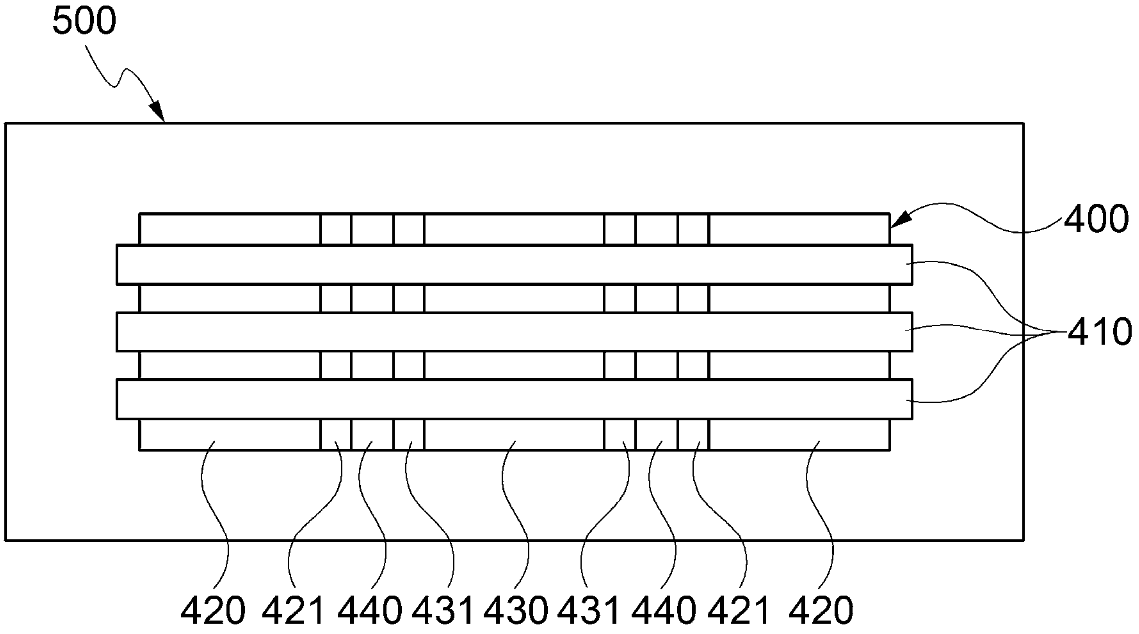
FIG. 7C is a plan view of FIG. 7A.

FIG. 7A is a schematic perspective view illustrating an excimer lamp according to a fourth embodiment of the present invention, FIG. 7B is a cross-sectional view taken along line I-I' of FIG. 7A, and FIG. 7C is a plan view of FIG. 7A.

Referring to FIGS. 7A to 7C, an excimer lamp 400 according to the fourth embodiment of the present invention may include: a light emitting tube 310 having an inner space filled with a discharge gas; first and second electrodes 420 and 430 disposed below the light emitting tube 410; and an auxiliary light emitting body 440 disposed between the first and second electrodes 420 and 430, which is similar to the above-described second embodiment.

Here, the excimer lamp 400 according to the fourth embodiment of the present invention includes a plurality of first electrodes 420 respectively disposed at a lower left side and a lower right side of the light emitting tube 410 and a second electrode 430 disposed between the plurality of first electrodes 420, which is unlike to the above-described second embodiment. Thus, the auxiliary light emitting body 440 may be also provided in plurality between the first electrode 420 and the second electrode 430. Alternatively, the excimer lamp 400 according to this embodiment may include a plurality of second electrodes 430 along an axial direction of the light emitting tube 410 and the first electrode 420 with the number corresponding to that of the second electrodes 430. Alternatively, the auxiliary light emitting body 440 may be disposed only between the second electrode 430 and the first electrode 420 disposed at the lower left side of the light emitting tube 410 or only between the second electrode 430 and the first electrode 420 disposed at the lower right side of the light emitting tube 410. That is, when at least one of the first and second electrodes 420 and 430 is provided in plurality, the auxiliary light emitting body 440 may be provided to at least one of portions between the first and second electrodes 420 and 430. However, the embodiment of the present invention is not limited thereto. The auxiliary light emitting body 440 is preferably provided to all installable portions in terms of maximizing the start-up characteristics and the light irradiation efficiency of the excimer lamp.

Also, as the first electrode 420 is provided in plurality, a second electrode end 431 may be formed on each of lower both side surfaces of the second electrode 430, and a first electrode end 421 may be formed on each of lower portions of the plurality of first electrodes 420 in correspondence to the second electrode end 431. Thus, a plurality of the auxiliary light emitting bodies 440 may be provided respectively adjacent to facing outer surfaces of the first and second electrode ends disposed at the lower left side of the light emitting tube 410 and facing outer surfaces of the first and second electrode ends disposed at the lower right side of the light emitting tube 410.

Thus, this embodiment also may improve start-up characteristics and a light irradiation efficiency of the excimer lamp 400 and the light irradiation device having the same and save miniaturization and manufacturing costs thereof by inducing light emission caused by discharge of the auxiliary light emitting body 440 through an electric field of the first and second electrode ends 421 and 431.

The above-described structure of the second embodiment may be also applied similarly to the excimer lamp 400 according to this embodiment and the light irradiation device 500 having the same except for the structure related to the first electrode 420, the plurality of auxiliary light emitting bodies 440, and the second electrode end 431.

According to the embodiments of the present invention, the excimer lamp and the light irradiation device having the same may have the improved start-up characteristics and light irradiation efficiency by supplying light having the same wavelength range as the light emitting tube into the light emitting tube through the auxiliary light emitting body and accelerating the ionization of the gas in the light emitting tube.

Also, according to the embodiments of the present invention, the excimer lamp and the light irradiation device having the same may be miniaturized and save the manufacturing cost by including the auxiliary light emitting body for the discharge of the light emitting tube between the first and second electrodes and omitting the additional installation space for the auxiliary light emitting body.

Also, according to the embodiments of the present invention, the separate space for the discharge of the auxiliary light emitting body and the circuit component may be omitted by simultaneously inducing the discharge of the auxiliary light emitting body when the voltage is applied to the first and second electrodes for the discharge of the light emitting tube. Thus, the excimer lamp and the light irradiation device having the same may be miniaturized, and the manufacturing cost may be further saved.

Although the embodiments of the present invention have been described, it is understood that the present invention should not be limited to these embodiments but various changes and modifications can be made by one ordinary skilled in the art within the spirit and scope of the present invention as hereinafter claimed. Therefore, the scope of this invention is defined not by the detailed description of the invention but by the appended claims, and all differences within the scope will be construed as being included in the present invention.

What is claimed is:

1. An excimer lamp comprising:

a light emitting tube configured to emit light;

a first electrode disposed at an outer side of the light emitting tube;

a second electrode disposed at an outer side of the light emitting tube in correspondence to the first electrode; and an auxiliary light emitting body disposed between the first electrode and the second electrode to emit light toward the light emitting tube when a voltage is applied to the first and second electrodes.

2. The excimer lamp of claim 1, wherein the light emitting tube and the auxiliary light emitting body emit light having the same wavelength range by dielectric barrier discharge generated when the voltage is applied to the first and second electrodes.

3. The excimer lamp of claim 1, wherein the auxiliary light emitting body is disposed at an outer side of the light emitting tube and disposed adjacent to facing outer surfaces of the first and second electrodes.

4. The excimer lamp of claim 1, wherein first and second electrode ends respectively protrude from mutually facing outer surfaces of the first and second electrodes, and the auxiliary light emitting body is disposed adjacent to facing outer surfaces of the first and second electrode ends.

5. The excimer lamp of claim 1, further comprising first and second auxiliary electrodes respectively disposed on mutually facing outer surfaces of the first and second electrodes, wherein the auxiliary light emitting body is disposed adjacent to facing outer surfaces of the first and second auxiliary electrodes.

6. The excimer lamp of claim 5, wherein the first and second auxiliary electrodes are made of a conductive material having a foil or leaf spring structure.

7. The excimer lamp of claim 1, wherein when at least one of the first and second electrodes is provided in plurality, the auxiliary light emitting body is disposed in at least one of portions between the first and second electrodes.

8. The excimer lamp of claim 3, wherein the auxiliary light emitting body has a tube shape having an axial direction crossing that of the light emitting tube.

9. The excimer lamp of claim 8, wherein the auxiliary light emitting body has a cross-sectional shape of one of a circle, an ellipse, and a polygon.

10. The excimer lamp of claim 1, wherein a maximum distance between outermost sides of a cross-section of the auxiliary light emitting body along a direction in which the first and second electrodes face each other is less than a diameter of the light emitting tube.

11. A light irradiation device comprising:

an excimer lamp comprising a light emitting tube configured to emit light, a first electrode disposed at an outer side of the light emitting tube, a second electrode disposed at an outer side of the light emitting tube in correspondence to the first electrode, and an auxiliary light emitting body disposed between the first electrode and the second electrode to emit light toward the light emitting tube when a voltage is applied to the first and second electrodes; and a case in which the excimer lamp is accommodated.

* * * * *